(12) United States Patent
Tachikawa et al.

(10) Patent No.: US 9,102,256 B2
(45) Date of Patent: Aug. 11, 2015

(54) HEADREST

(75) Inventors: Yoichi Tachikawa, Tochigi (JP); Shigeru Adachi, Tochigi (JP); Hiroshi Izawa, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 14/008,089

(22) PCT Filed: Mar. 29, 2012

(86) PCT No.: PCT/JP2012/058418
§ 371 (c)(1),
(2), (4) Date: Dec. 3, 2013

(87) PCT Pub. No.: WO2012/133677
PCT Pub. Date: Oct. 4, 2012

(65) Prior Publication Data
US 2014/0077564 A1   Mar. 20, 2014

(30) Foreign Application Priority Data

Mar. 31, 2011 (JP) ................................. 2011-081070

(51) Int. Cl.
*B60N 2/48* (2006.01)
*B60N 2/58* (2006.01)

(52) U.S. Cl.
CPC ............ *B60N 2/4802* (2013.01); *B60N 2/4855* (2013.01); *B60N 2/5841* (2013.01); *B60N 2002/4897* (2013.01)

(58) Field of Classification Search
CPC ............. A47C 7/38; B60R 2011/0017; B60N 2/4864; B60N 2/4838; B60N 2/2851
USPC ......................................... 297/228, 391, 410
See application file for complete search history.

(56) References Cited

U.S. PATENT DOCUMENTS

| | | | |
|---|---|---|---|
| 4,256,341 A | 3/1981 | Göldner et al. | |
| 6,149,233 A * | 11/2000 | Takei et al. | 297/220 |
| 6,499,805 B1 * | 12/2002 | Watadani | 297/408 |
| 7,267,407 B1 * | 9/2007 | Demick et al. | 297/410 |
| 8,408,645 B2 * | 4/2013 | Alexander et al. | 297/216.12 |
| 8,414,078 B2 * | 4/2013 | Fujita | 297/408 |
| 2006/0214491 A1 | 9/2006 | Metz et al. | |
| 2008/0211286 A1 * | 9/2008 | Morilhat et al. | 297/396 |

FOREIGN PATENT DOCUMENTS

| | | |
|---|---|---|
| JP | 61-163549 U | 10/1986 |
| JP | 08-155981 A | 6/1996 |
| JP | 2951953 B1 | 9/1999 |
| JP | 2001-128784 A | 5/2001 |
| JP | 2006-520226 A | 9/2006 |
| JP | 2008-253335 A | 10/2008 |
| JP | 2010-215015 A | 9/2010 |

* cited by examiner

*Primary Examiner* — Sarah B McPartlin
(74) *Attorney, Agent, or Firm* — Drinker Biddle & Reath LLP

(57) ABSTRACT

Provided is a headrest that is capable of improving the rigidity of a headrest frame and preventing the leakage of a foaming agent upon integral foam formation of the headrest. The headrest, which is disposed on the upper part of a seatback and includes a headrest frame inside the headrest, includes a retaining portion of a headrest stay guide in the headrest frame. Further, the headrest is configured in a manner that a headrest skin is sandwiched between the headrest stay guide and the headrest frame.

11 Claims, 11 Drawing Sheets

HEADREST

CROSS REFERENCE TO RELATED APPLICATIONS

This application is the U.S. national phase of the International Patent Application No. PCT/JP2012/058418, filed Mar. 29, 2012, which claims the benefit of the following Japanese Patent Application: Application No. 2011-081070, filed Mar. 31, 2011, the entire content of which is incorporated herein by reference.

BACKGROUND

Disclosed herein is a headrest, especially a headrest having a headrest frame therein.

A technique in which a headrest has a headrest frame therein is conventionally known (Japanese Patent Document 1996(H08)-155981 A (FIGS. 1 and 12) ("the '981 Document", for example). This document discloses a technique in which a headrest includes a headrest frame therein and, upon integral foam formation of a pad member, spread of a foamed resin into the headrest frame is prevented. However, the '981 Document does not refer to rigidity improvement of the headrest. For example, a thicker headrest frame for rigidity improvement may deteriorate sitting comfort of an occupant, and a technique has been desired that allows rigidity improvement without any size change of the headrest frame.

It is an object of various embodiments of the present invention to provide a headrest including a headrest frame therein with an improved rigidity of the headrest frame.

It is another object to provide a headrest having a configuration with an ensured sealing such that leakage of a foaming agent is prevented upon integral foam formation of a headrest skin, a pad member, and the headrest frame.

SUMMARY

The above-described problems are solved by a headrest that is disposed on an upper part of a seatback of a vehicle seat, the headrest including a headrest frame therein, in which the headrest frame includes a retaining portion of a headrest stay guide.

In this way, because of the headrest frame including the retaining portion of the headrest stay guide, the rigidity of the headrest frame can be improved.

Further, it is preferable that the headrest includes a pad member and a headrest skin that covers the pad member, and the headrest skin is configured to be sandwiched between the headrest stay guide and the headrest frame inside the headrest.

In this way, because of the headrest skin being sandwiched between the headrest stay guide and the headrest frame inside the headrest, a seal configuration can be achieved such that leakage of a foaming agent is prevented upon integral foam formation of the headrest skin, the pad member, and the headrest frame without any special member or additional component.

At this time, it is preferable that the headrest frame is configured by two members, a mating surface of the headrest frame being configured by two members and an insertion opening for the headrest stay guide are configured to intersect with each other, and a surface on which the insertion opening is formed is a seal surface and an entire part of the seal surface is integrally formed.

In this way, the mating surface of the headrest frame and the insertion opening for the headrest stay guide are configured to intersect with each other, and the entire part of a seal surface, which is a surface on which the insertion opening is formed, is integrally formed. Since the headrest skin can be tightly sandwiched between the headrest stay guide and the headrest frame, upon integral foam formation of the headrest skin, the pad member, and the headrest frame, the sealing can further be improved that prevents the leakage of a foaming agent to the outside of the headrest skin.

In any of the above-described cases, it is further preferable that the headrest frame is configured by two members, in the two members, a rear member of the headrest is made from a metal and a front member of the headrest is made from a resin, the retaining portion of the headrest stay guide is formed on the rear member made from the metal of the headrest frame, and a periphery of the insertion opening for the headrest stay guide of the headrest frame is annularly formed so that an entire periphery thereof is integrally formed.

This configuration can improve the rigidity because of the retaining portion of the headrest stay guide being attached to the rear metal frame, while suppressing the deterioration of the sitting comfort because of the front resin. Further, this configuration can improve the rigidity of the front frame because of the circumference of the insertion opening for the headrest stay guide being annularly formed so that the entire circumference thereof is integrally formed.

Further, it is preferable that a free end of the headrest frame on which an opening is formed has a downwardly-facing inverted U-shape, and a stepped portion is formed on the opening.

The inverted U-shape in this way can improve the rigidity of the headrest frame while improving assembly productivity, since a foaming agent can easily spread upon integral foam formation of the headrest skin, the pad member, and the headrest frame.

According to a headrest as in an embodiment, the rigidity of a headrest frame, in the headrest including the headrest frame inside thereof, can be improved.

According to the headrest as in an embodiment, upon integral foam formation of a headrest skin, a pad member, and the headrest frame, the sealing that prevents the leakage of a foaming agent to the outside of the headrest skin can be ensured without any special member or additional component.

According to the headrest as in an embodiment, upon integral foam formation of the headrest skin, the pad member, and the headrest frame, the sealing that prevents the leakage of a foaming agent to the outside of the headrest skin can further be improved.

According to the headrest as in an embodiment, the rigidity of the headrest frame is improved while the deterioration of sitting comfort of an occupant can be suppressed.

According to the headrest as in an embodiment, the rigidity of the headrest frame can be improved while, upon integral foam formation of the headrest skin, the pad member, and the headrest frame, a foaming agent easily spread around and thus the productivity is improved.

DETAILED DESCRIPTION

Figure 1:
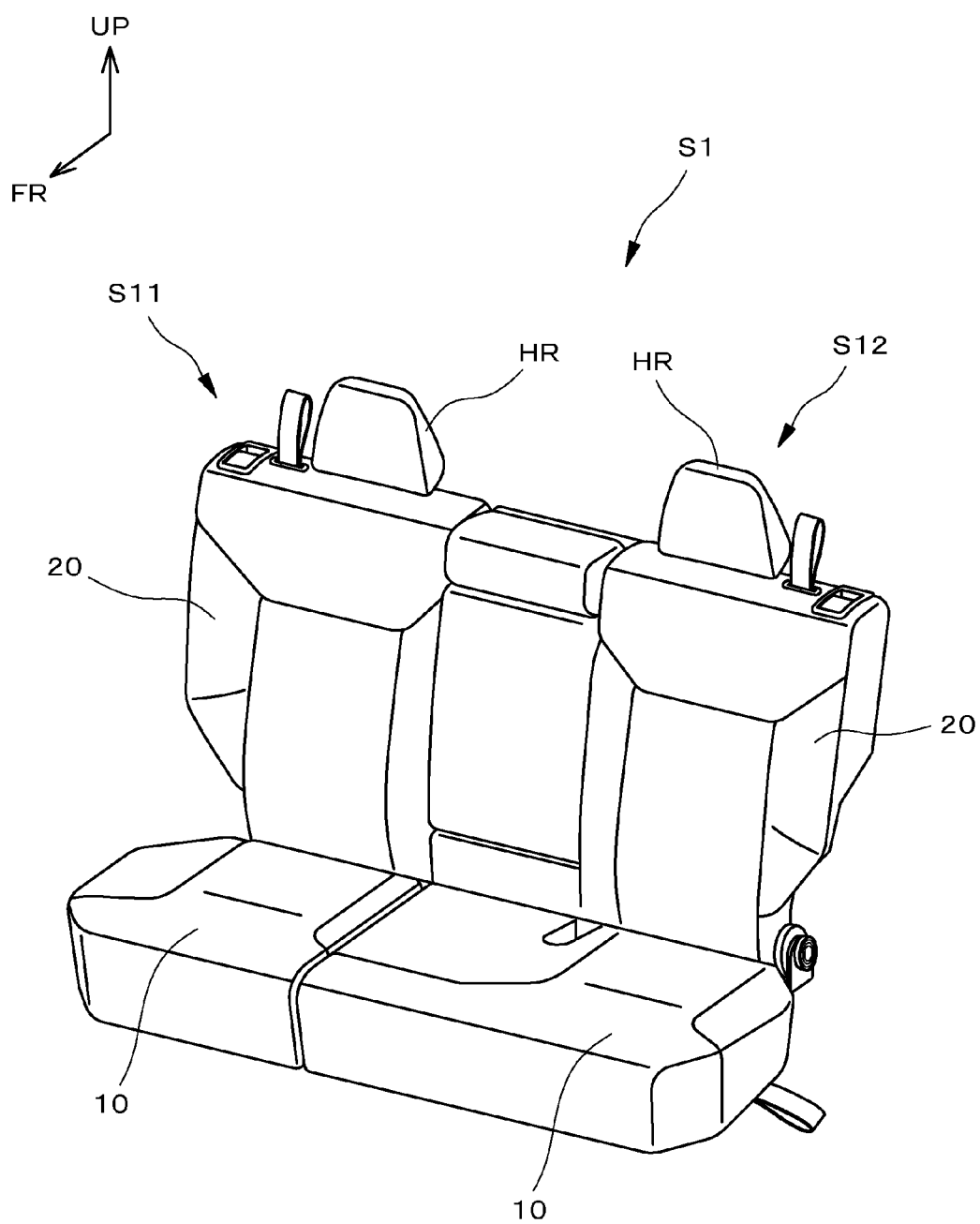
FIG. 1 is a perspective view of a vehicle seat using a headrest according to an embodiment of the present invention.
Figure 2:
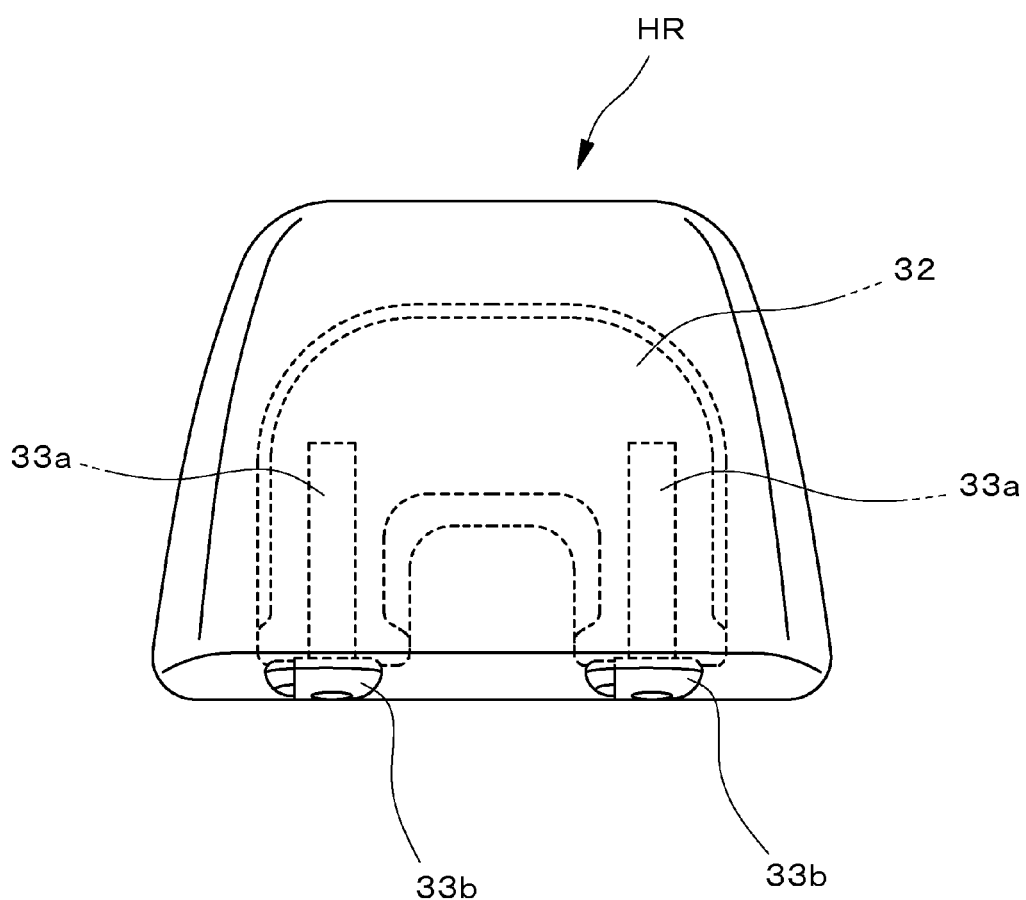
FIG. 2 is a schematic front view illustrating the headrest according to an embodiment of the present invention.
Figure 3:
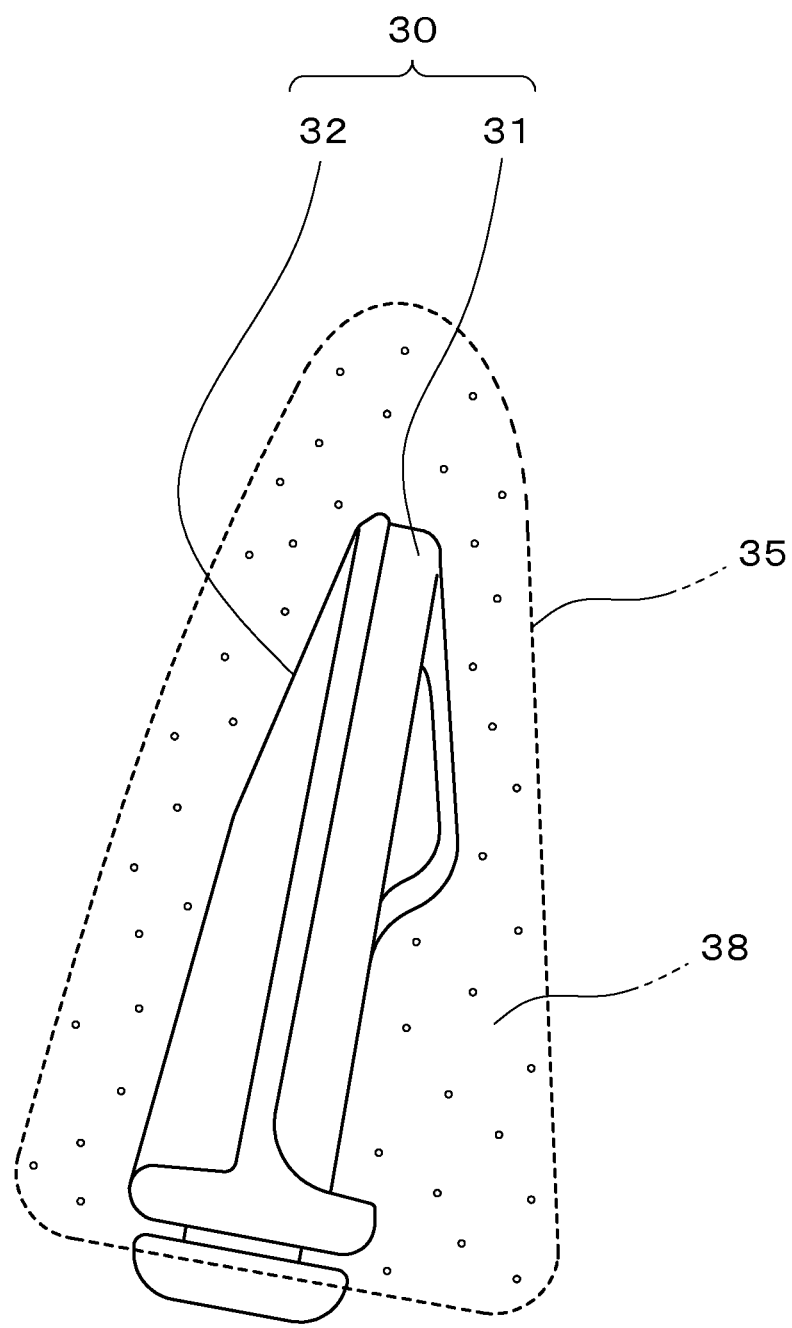
FIG. 3 is a schematic side view illustrating the headrest according to an embodiment of the present invention.

An embodiment according to the present invention is described below with reference to the drawings. It should be noted that members, arrangement, and the like may be variously modified within the scope of the present invention without limiting the present invention.

FIGS. 1 to 11 show a headrest according to an embodiment of the present invention.

First, a configuration of a vehicle seat S1 to which a headrest HR is attached will be described. In this embodiment, the vehicle seat S1 is separated into a right side (passenger's seat side) vehicle seat S11 and a left side (front driver's seat side) vehicle seat S12. Each of the vehicle seats S11 and S12 is provided with a seat cushion 10, a seatback 20, and the headrest HR. Although the right side vehicle seat S11 and the left side vehicle seat S12 are different from each other, both the vehicle seats S11 and S12 are common with regard to the headrest HR. Therefore, in the following description, only the headrest HR on the right side vehicle seat S11 is described as an example.

The headrest HR in this embodiment is disposed on the upper part of the seatback 20, and as shown in FIGS. 2 to 8, is formed by filling a pad member 38 between a headrest frame 30 (a rear frame 31, a front frame 32) having an inverted U-shape with a downwardly-facing free end on which an opening, which will be described later, is formed, and a headrest skin 35. The headrest frame 30 (the rear frame 31, the front frame 32) that is configured to have an inverted U-shape in this way can improve the rigidity of the headrest frame 30 and the assembly productivity upon integral foam formation of the headrest skin 35, the pad member 38, and the headrest frame because a foaming agent can easily spread around.

The headrest skin 35 is formed into a bag shape. On the bottom surface of the headrest skin 35, an opening 35a as a foam inlet into which a liquid foam resin is injected and the two holes 35b, 35b into which a headrest stay 37, which will be described later, is inserted are formed. The headrest skin 35 may be made from a woven fabric, a non-woven fabric, a synthetic resin, or the other known materials. In this way, on the headrest skin 35, ends of a headrest stay guide 33 are disposed to be located on the outside of the headrest skin 35.

Further, the headrest HR is integrally formed by disposing, in the headrest skin 35, the headrest frame 30 (the rear frame 31, the front frame 32) through the opening 35a that is formed on the headrest skin 35, putting the headrest skin 35 into a mold, which is not shown, and then filling a foaming agent from the opening 35a. In the headrest HR, the headrest skin 35, the headrest frame 30 (the rear frame 31, the front frame 32), and the pad member 38, made from urethane or the like, are integrally formed.

The headrest frame 30 (the rear frame 31, the front frame 32) in this embodiment is configured by two members (the rear frame 31, the front frame 32) as shown in FIGS. 4 to 7, and the two members (the rear frame 31, the front frame 32) are configured to be joined and fit using a longitudinal wall as a mating surface (see FIG. 5) as described later.

Specifically, in the two members (the rear frame 31, the front frame 32) that configure the headrest frame 30, the rear side of the headrest HR is formed by the rear frame 31 made from a metal, and the front side of the headrest HR is formed by the front frame 32 made from a synthetic resin. The headrest HR is formed by the two members (the rear frame 31, the front frame 32) into a hollow wafers shape without fillings. Thus, improved rigidity and lightened weight can be achieved. The part that forms leg portions 31b, 32b, which are on the both sides of the headrest frame 30 having an inverted U-shape respectively, is made into a hollow shape, inside which a space that receives the headrest stay guide 33 having a hollow rod shape is formed. The headrest stay guide 33 is retained and received by a retaining portion 34, which will be described later, and inserted from the free end side of the headrest frame 30 to be reciprocally configured.

Figure 4:
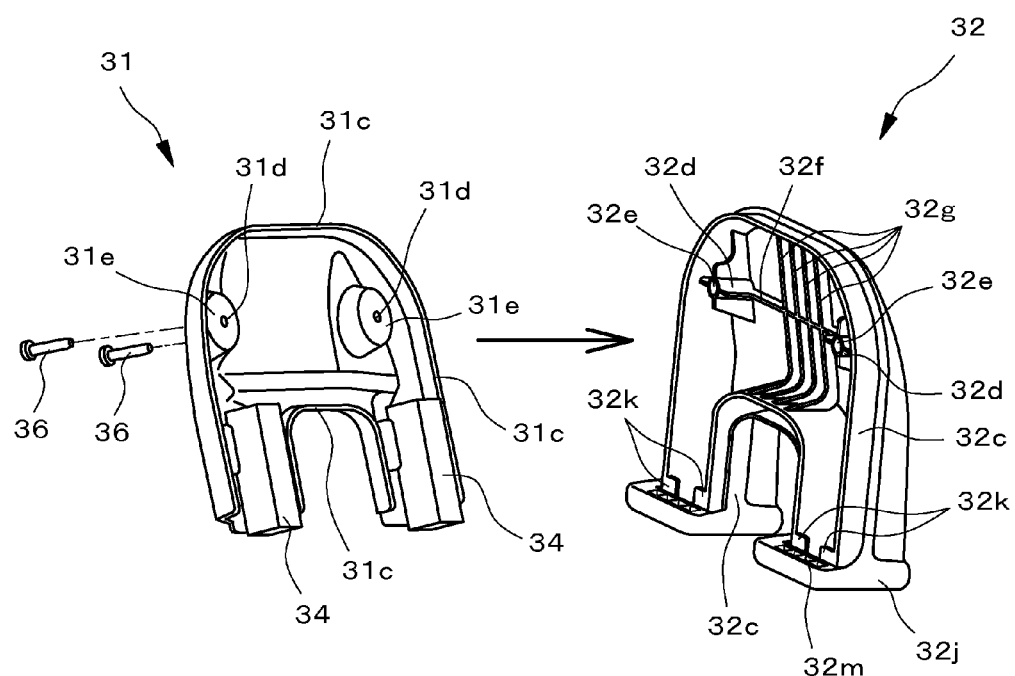
FIG. 4 is an exploded schematic perspective view of a headrest frame.
Figure 6:
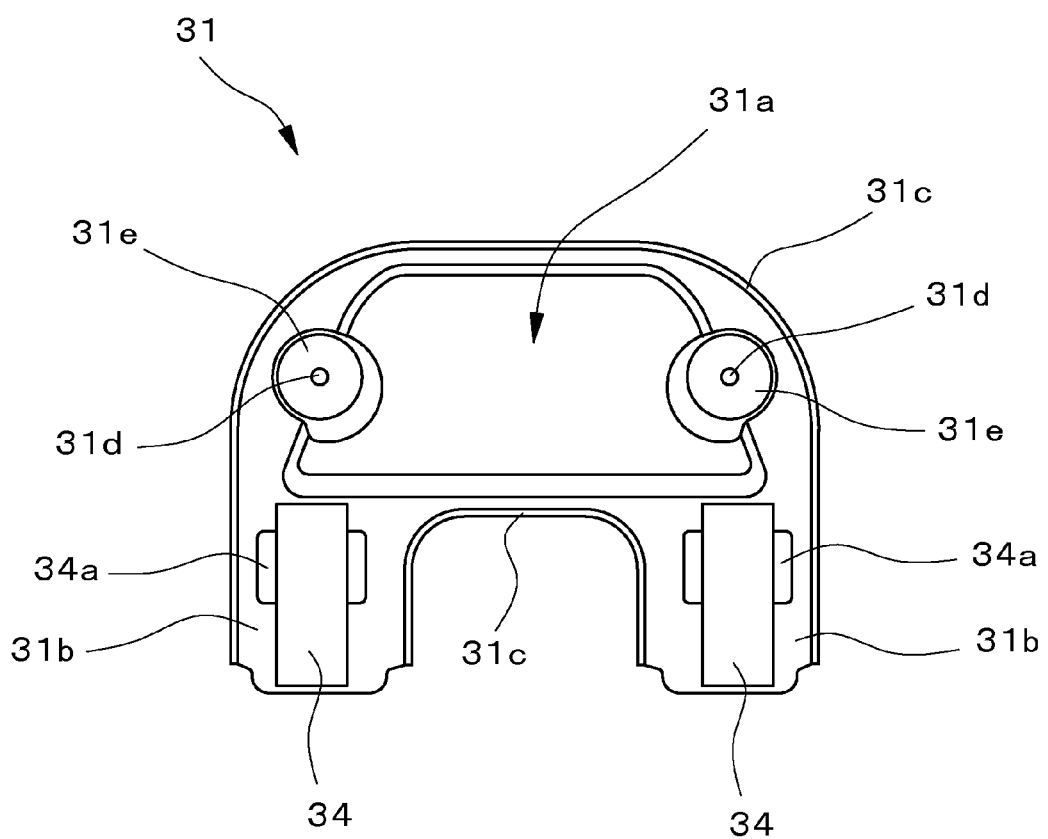
FIG. 6 is an illustrative front view showing internal components seen from a front side of the headrest frame.

The rear frame 31 is made from a known metal and, as shown in FIGS. 4 and 6, is formed by a support surface portion 31a of the upper part thereof, and the leg portions 31b, 31b that extend from the support surface portion 31a to the both side thereof. The rear frame 31 has an inverted U-shape with a downwardly-facing free end, and on the outer circumference except the free end thereof, a longitudinal wall 31c as a mating surface is formed. In FIG. 6, on the part closer to the support surface portion 31a than base ends of the leg portion 31b on the both sides of the support surface portion 31a, a screw hole 31d, which will be described next, that is joined with the front frame 32, are formed respectively. The screw hole 31d has a bulging portion 31e of which circumference bulges inward.

Figure 5:
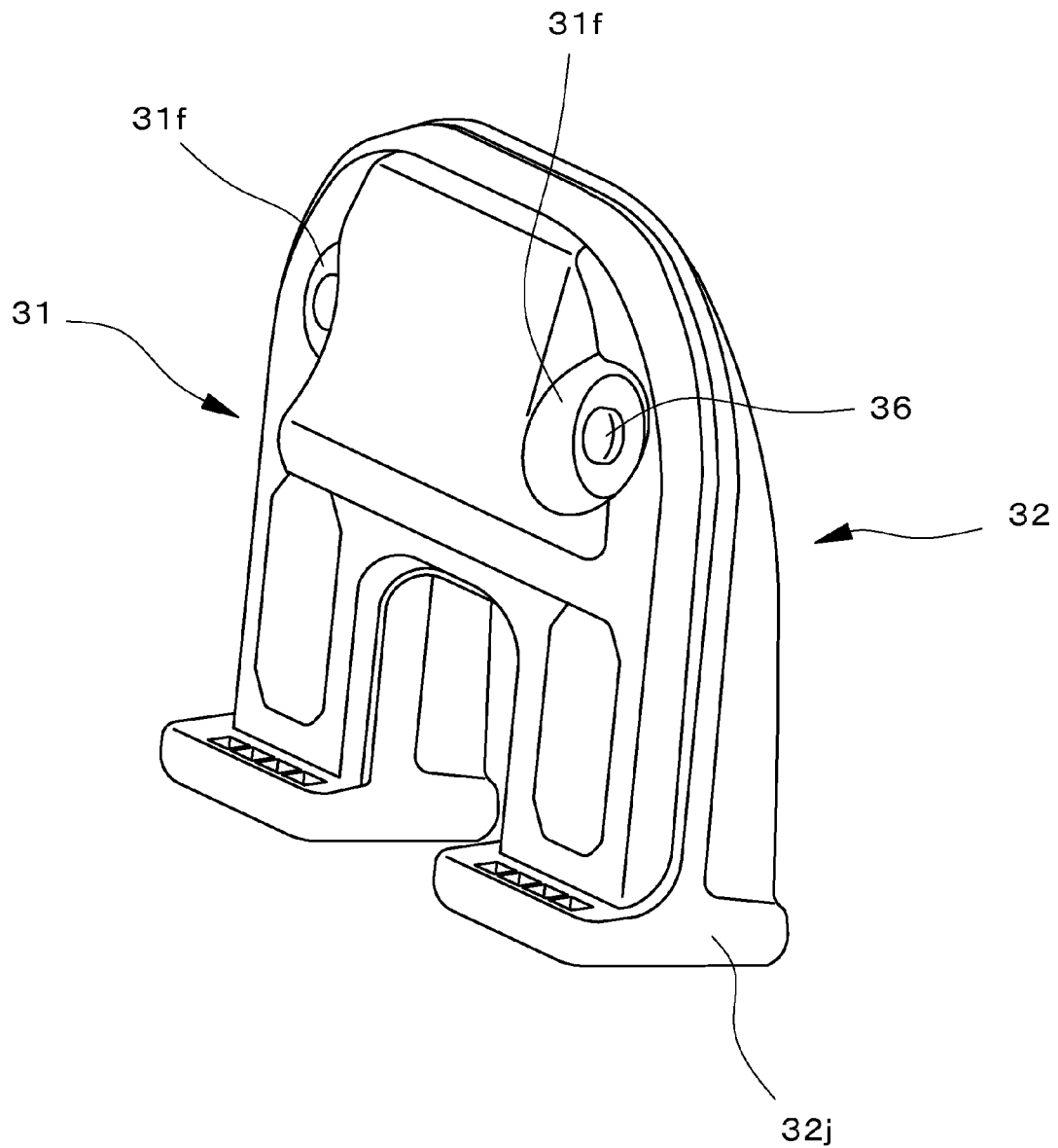
FIG. 5 is a schematic perspective view of the headrest frame.

In other words, the screw hole 31d of the rear frame 31 is a recessed portion 31f as shown in FIG. 5, when seen from the outer surface. In this way, since, on the screw hole 31d formed on the rear frame 31 of the headrest frame 30, the surface to which a joint member 36 such as a screw is attached is made into the recessed portion 31f, the joint member 36 does not bulge toward the pad member 38, so that damage of the pad member 38 by the joining member 36 such as a screw can be suppressed.

On the headrest frame 30, the headrest stay guide 33 is disposed for inserting the headrest stay 37. The headrest stay guide 33 is configured to be retained by the retaining portion 34 disposed inside the headrest frame 30. As shown in FIGS. 4 and 6, the retaining portion 34 has a square cross section shape that is formed by bending a metal plate, and is fixed to the rear frame 31 (made from a metal) of the headrest frame 30 by a fixing portion 34a through welding or the like. The retaining portion 34 that is joined with the rear frame 31 by the fixing portion 34a through welding or the like can thus improve the rigidity of the headrest frame 30 itself. Further, the weld surface of the retaining portion 34 of the headrest stay guide 33 is bent to have a flat square shape that facilitate welding, so that the rear frame 31 and the retaining portion 34 are strongly welded to each other and the rigidity is improved.

Figure 7:
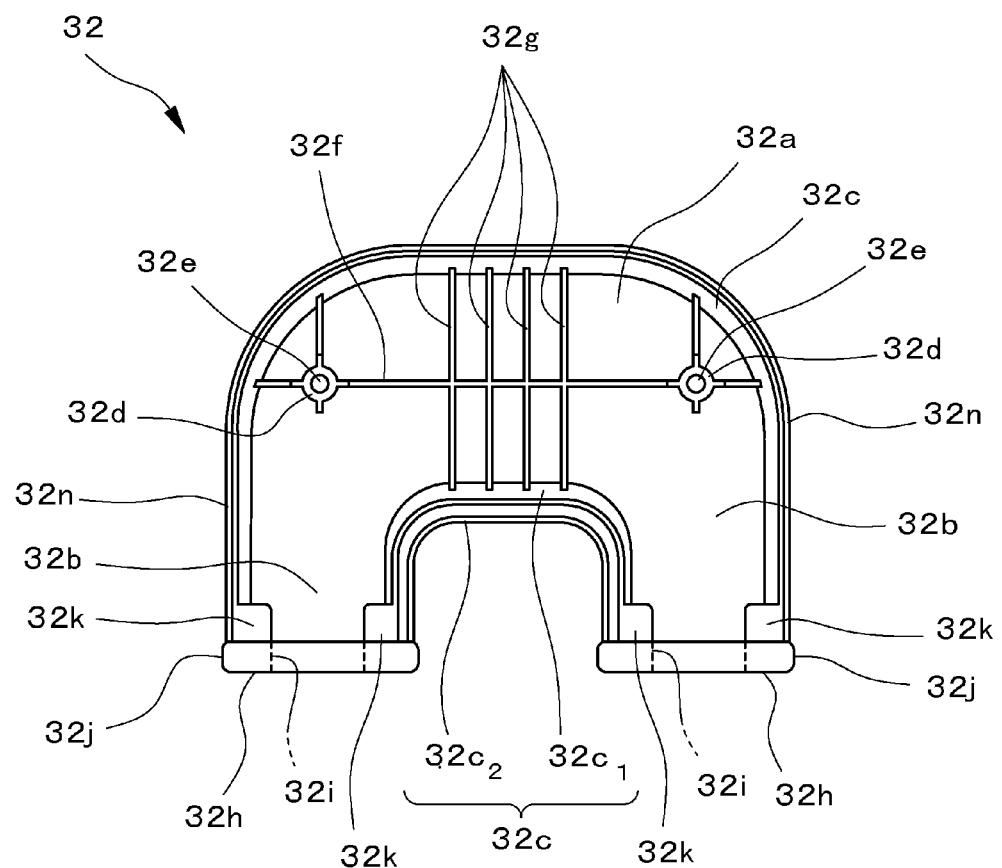
FIG. 7 is an illustrative rear view seen from the other inside of the headrest frame.

The front frame 32 of the headrest frame 30 is made from a synthetic resin such as polypropylene or the like. The front frame 32 is formed by a support surface portion 32a of the upper part thereof and the leg portions 32b, 32b that extends to the both sides thereof respectively from the support surface portion 32a, and has an inverted U-shape with a downwardly-facing free end, and a longitudinal wall 32c as a fitting surface is formed on the outer circumference except the free end. A contact surface 32n, which is a mating surface on the outer circumference of the front frame 32 that forms an inverted U-shape has, as shown in FIG. 7, a flat outer circumferential surface to be in contact with the above-described longitudinal wall 31c of the rear frame 31. The longitudinal wall 32c on the inner circumference that forms the leg portion 32b is configured by a longitudinal wall 32c1 on the side of the support surface portion 32a and a longitudinal wall 32c2 that is separated from the longitudinal wall 32c1 by a certain distance, and between the longitudinal wall 32c1 and the longitudinal wall 32c2, the longitudinal wall 31c inside the leg portion 31b of the rear frame 31 is fit.

Further, on the support surface portion 32a of the front frame 32, a joint screw portion 32d as a joint portion that is jointed with the rear frame 31 is formed at the position that is aligned with the screw hole 31d of the above-described rear frame 31. On the joint screw portion 32d, into which the joint member 36 such as a screw is inserted from the screw hole 31d of the rear frame 31 for assembly, a guide hole 32e is formed in this embodiment.

In this embodiment, on the end portion of the leg portion 32b (the lower end) of the front frame 32, a seal surface 32h that is integrally formed with the front frame 32 is formed as shown in FIG. 7. On the seal surface 32h, an opening 32i into which the headrest stay guide 33 is inserted, and the surface circumference on which the opening 32i is formed has an annular shape. This enables a configuration such that, around the opening 32i, the headrest skin 35 is sandwiched between the headrest stay guide 33 to ensure the sealing. Further, the entire circumference is integrally formed and thus the rigidity of the front frame 32 can be improved.

The longitudinal wall 32c and the contact surface 32n as a mating surface of the headrest frame 30 is configured to intersect with the opening 32i into which the headrest stay guide 33 is inserted. The opening 32i forms a stepped portion 32j. Specifically, the seal surface 32h is formed on the free end of the front frame 32 simultaneously with the opening 32i, which are disposed on the stepped portion 32j. The stepped portion 32j that is disposed in this way enables rigidity improvement of the headrest frame 30.

In this embodiment, on the side of the free end of the leg portion 32b of the front frame 32, on the upper part of the seal surface 32h, a protrusion wall 32k as a fitting guide is formed toward the inside of the leg portion as shown in FIGS. 4 and 7. This configuration assists the fitting at a substantially appropriate position instead of an accurate alignment upon fitting.

As shown in FIG. 4, on the inside upper surface of the stepped portion 32j of the front frame 32, a rib 32m is disposed in the orthogonal direction to the fitting surface with the rear frame 31. The rib 32m that is disposed in this way enables, upon fitting between the rear frame 31 and the front frame 32, to close the rib 32m at the fitting portion of the rear frame 31, which provides error absorption as well as rattling prevention.

In this embodiment, the joint rib portion 32d is disposed at two positions in accordance with the rear frame 31. The two joint rib portions 32d are connected to the rear frame 31 by a connection rib 32f as shown in FIGS. 4 and 7. In this way, the front frame 32 and the rear frame 31 are fit to each other on the respective longitudinal walls 31c, 32c. The plurality of the joint rib portions 32d that are disposed on the front frame 32 made from a resin and are connected thereto by the connection rib 32f enables rigidity improvement of the headrest frame 30 itself, since the attachment position of the joint rib portion 32d having a high rigidity can be connected by the connection rib 32f. Although in this embodiment, the joint rib portion 32d is disposed at two positions, the joint rib portion 32d may appropriately be disposed in any multiple number without limitation.

In this embodiment, on the support surface portion 32a, at least one orthogonal rib 32g is formed to orthogonally intersect with the above-described connection rib 32f. Although in this embodiment, four orthogonal ribs 32g are disposed, the number thereof is not limited thereto as long as at least one orthogonal rib 32g is disposed. This configuration can further improve the rigidity of the headrest frame 30.

For the assembly through the fitting between the rear frame 31 and the front frame 32 that configure the headrest frame 30, the joint rib portion 32d formed by a boss is disposed inside the front frame 32 to protrude inwardly, and the joint member 36 of the headrest frame 30 is attached from the direction of the rear frame 31 (specifically, the joint is achieved in the direction from the rear frame 31 to the front frame 32). This configuration can suppress deterioration of sitting comfort because of the protrusion such as the joint member 36 on the side of the occupant's head.

Figure 8:
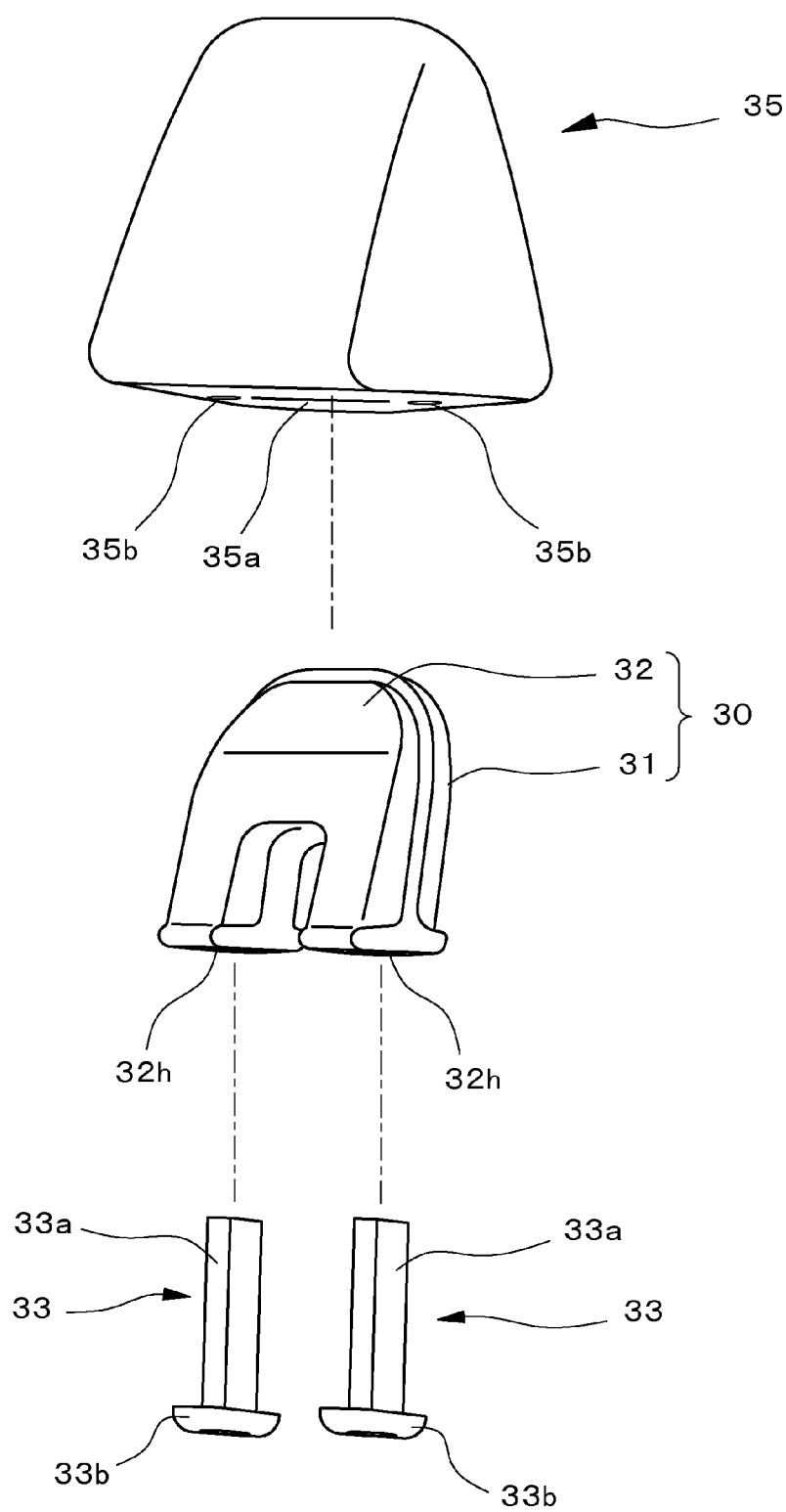
FIG. 8 is an exploded schematic perspective view illustrating the assembly of the headrest.
Figure 9:
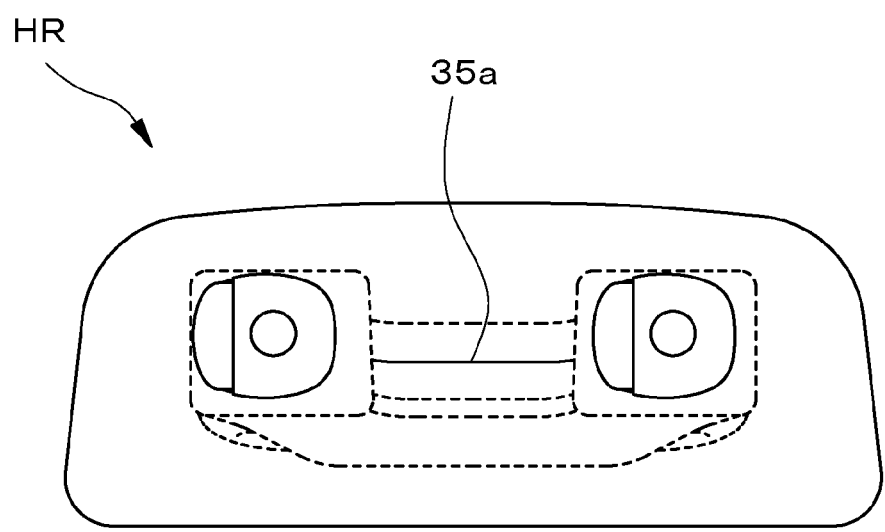
FIG. 9 is an illustrative bottom view seen from the bottom surface of the headrest.
Figure 10:
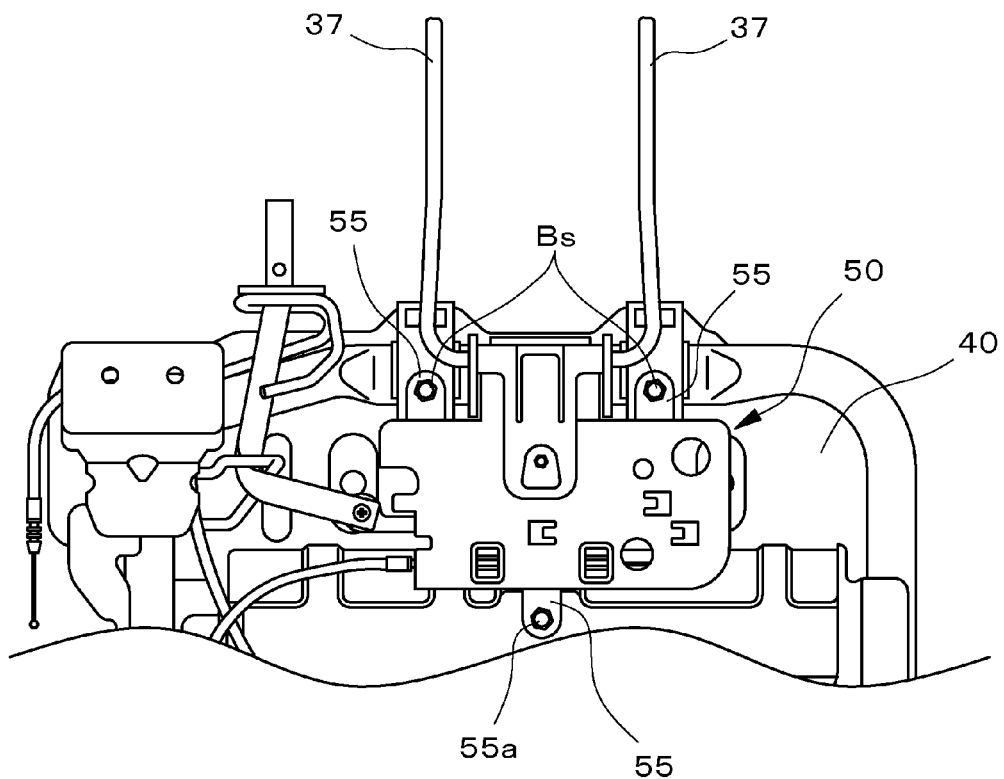
FIG. 10 is a main part illustrative front view illustrating a headrest stay and mechanism that supports the headrest.

As shown in FIG. 8, the headrest stay guide 33 is configured by a hollow sliding body 33a that is retained by the retaining portion 34 and a lower end flange portion 33b that is formed on the end. The sliding body 33a in this embodiment has a square cross section shape that is slightly smaller than the retaining portion 34 in accordance with the shape of the retaining portion 34. In this way, it is preferable for the sliding body 33a to have a shape in accordance with the shape of the retaining portion 34.

This embodiment enables the configuration with an improved rigidity because of the retaining portion 34 of the headrest stay guide 33 that is attached to the rear frame 31 made from a metal, while suppressing deterioration of sitting comfort because of the front side that is configured by the front frame 32 made from a resin.

For shaping the headrest HR through integral foaming, the headrest frame 30 is formed as described above, and having a bag shape is disposed on the headrest frame 30 through the opening 35a from the part that configures the leg portions 31b, 32b respectively on both sides of the headrest frame 30 having an inverted U-shape. Further, the headrest skin 35 is sandwiched between the lower end flange portion 33b of the headrest stay guide 33 and the seal surface 32h of the headrest frame 30 inside the headrest HR. This prevents the leakage of a foaming agent from the headrest skin 35 upon integral foaming of the headrest skin 35, the pad member 38, and the headrest frame 30 without any special member or additional component. In particular, the headrest skin 35 can be tightly sandwiched between the seal surface 32h and the lower end flange portion 33b, so that the sealing that prevents the leakage of a foaming agent to the outside of the headrest skin is further improved.

In the headrest HR having the above-described configuration, when the headrest stay guide 33 is at the most retracted position in the part that is configured by the leg portions 31b, 32b of the headrest frame 30 (i.e., in the state where the headrest stay guide 33 is housed inside the headrest HR), the part around the holes 35b, 35b in the headrest skin 35 of the headrest HR is sandwiched by the seal surface 32h of the headrest frame 30 and the lower end flange portion 33b of the headrest stay guide 33.

In this embodiment, the headrest HR is, in the state where a pair of headrest stays 37 (see FIGS. 10 and 11) made of a metal rod is inserted into the headrest stay guide 33, supported by the headrest stays 37. Each of the headrest stays 37 is rotatably supported by a casing 51 of a headrest rotation mechanism 50, which will be described later. The headrest HR is capable of rotating from the upright state on the upper part of the seatback 20 to the folded state that is turned forward by approximately 90 degrees, by way of the headrest rotation mechanism 50.

Figure 11:
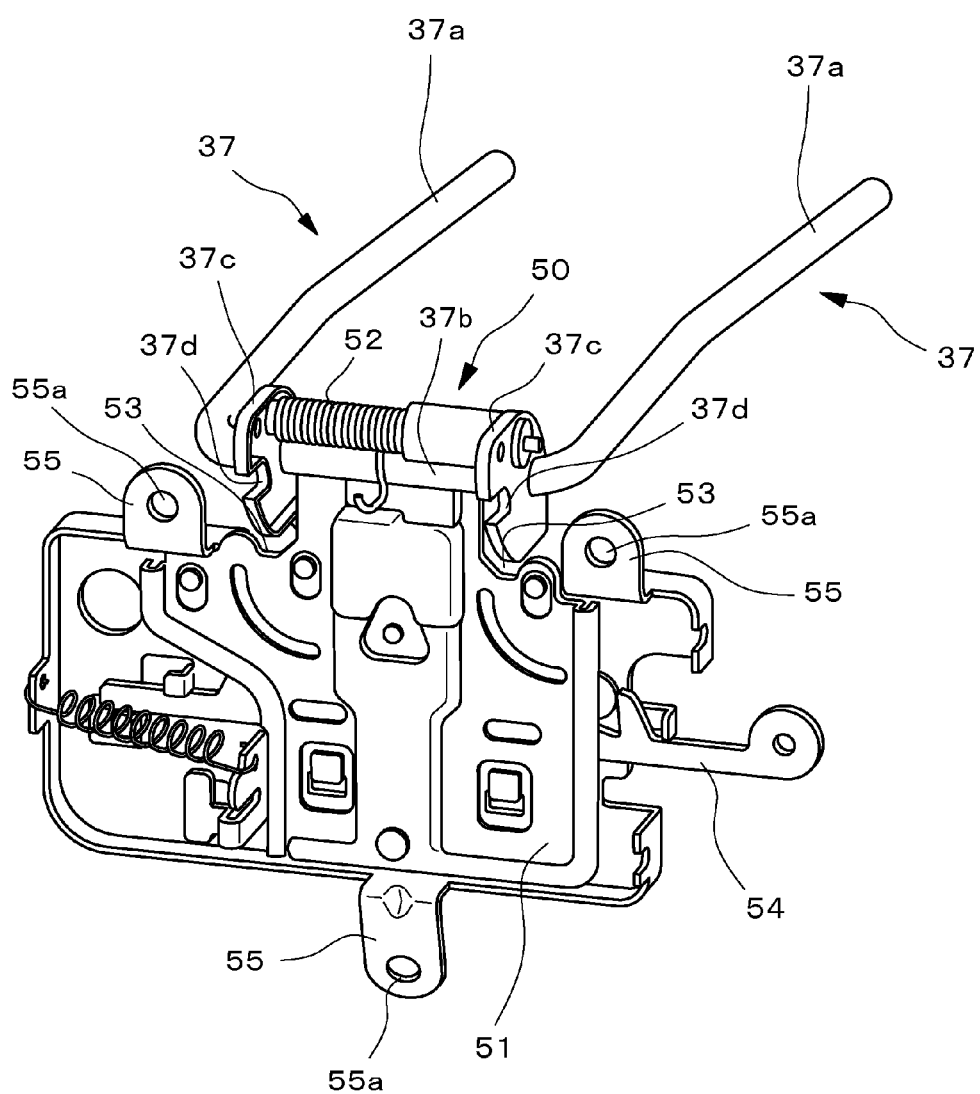
FIG. 11 is a perspective view illustrating the mechanism that supports the headrest.

Now the headrest rotation mechanism 50 is described. The headrest rotation mechanism 50 includes, as shown in FIG. 11, the casing 51, a biasing spring 52, a lock member 53, and a slide member 54.

The headrest rotation mechanism 50 is a mechanism that turns the headrest HR forward by rotating the headrest stay 37 forwardly. The headrest rotation mechanism 50 is disposed on the front upper part of a seatback frame 40 in the state where it is covered with a resin cover that is not shown.

The casing 51 forms a housing of the headrest rotation mechanism 50 and, in this embodiment, is configured by overlapping metal plates having a substantially rectangular shape. Inside the casing 51, the lock member 53 and the slide member 54 is housed. On the casing 51, a plurality of attachment portions 55 on which a hole 55a is formed respectively project outwardly, and the attachment portions 55 and the seatback frame 40 are fixed by screws BS. The casing 51 rotatably supports the headrest stay 37 on the upper part thereof. The biasing spring 52 is an example of a biasing member that biases the headrest stay 37 forwardly, and is disposed on the side of the back surface (the rear surface) of the casing 51.

The lock member 53 is a metal piece member that is engaged with the headrest stay 37 to maintain the upright position of the headrest stay 37 against the biasing force of the biasing spring 52. The upright position herein refers to the disposed state of the headrest stay 37 when the headrest HR stands on the upper part of the seatback 20.

The configuration of the lock member 53 will be described further in detail. As shown in FIG. 11, the headrest stay 37 includes a vertical portion 37a that extends along the height direction of the vehicle seat S1 (in other words, along the up and down direction of the seatback 20), a horizontal portion 37b that is adjacent to the lower part of the vertical portion 37a and extends along the right and left direction (in other words, along the width direction of the seatback 20), and a pillar-side engagement portion 37c having a substantially fan shape at the end of the horizontal portion 37b. The lock member 53 is fit into a notch 37d that is formed on the headrest stay 37-side engagement portion 37c to be engaged with the headrest stay 37, and the upright position of the headrest stay 37 is maintained.

The lock member 53 is oscillatably supported in the casing 51, to move between the position (engaged position) where a part of the lock member 53 is exposed to the outside of the casing 51 that allows to be fit into the notch 37d of the headrest stay 37-side engagement portion 37c and the position (released position) where the exposed position is retracted into the casing 51 to be released from the notch 37d.

The slide member 54 is a long body that is stored inside the casing 51 and slides along the width direction of the seatback 20 to oscillate the lock member 53. The slide member 54 is usually at a position where the lock member 53 is caused to shift to the engaged position. Then, when the slide member 54 slides to one end in the longitudinal direction, the lock member 53 is caused to shift to the released position.

In the headrest rotation mechanism 50 with the above-described configuration, in the case where the lock member 53 is engaged at the engaged position with the headrest stay 37-side engagement portion 37c of the headrest stay 37, the headrest stay 37 is maintained at the upright position against the biasing force of the biasing spring 52 and thus the headrest HR is maintained at the seated position.

In the case where the lock member 53 is oscillated from the engaged position to the released position through the slide movement of the slide member 54, upon the engagement release between the lock member 53 and the headrest stay 37-side engagement portion 37c, the headrest stay 37 is rotated forward by the biasing force of the biasing spring 52 and accordingly the headrest HR is folded forward.

TABLE OF REFERENCE NUMERALS

S1 vehicle seat
S11 vehicle seat
S12 vehicle seat
10 seat cushion
20 seatback
HR headrest
30 headrest frame
31 rear frame
31a support surface portion
31b leg portion
31c longitudinal wall
31d screw hole
31e bulging portion
31f recessed portion
32 front frame
32a support surface portion
32b leg portion
32c longitudinal wall
32c1 longitudinal wall
32c2 longitudinal wall
32d joint rib portion
32e guide hole
32f connection rib
32g orthogonal rib
32h seal surface
32i opening
32j stepped portion
32k protrusion wall
32m rib
32n contact surface
33 headrest stay guide
33a sliding body
33b lower end flange portion
34 retaining portion
34a fixing portion
35 headrest skin
35a opening
35b hole
36 joint member
37 headrest stay
37a vertical portion
37b horizontal portion
37c engagement portion
37d notch
38 pad member
40 seatback frame
50 headrest rotation mechanism
51 casing
52 biasing spring
53 lock member
54 slide member
55 attachment portion 55a hole
BS screw

The invention claimed is:

1. A headrest disposed on an upper part of a seatback of a vehicle seat, the headrest comprising:
a headrest frame;
wherein:
the headrest frame includes a retaining portion of a headrest stay guide;
one of a front side and a rear side of the headrest frame is made from a metal, and an other of the front side and the rear side of the headrest frame is made from a resin; and
the retaining portion of the headrest stay guide is formed on the one of the front side and the rear side of the headrest frame made from the metal.

2. The headrest according to claim 1, wherein:
the headrest includes a pad member and a headrest skin that covers the pad member; and
the headrest skin is sandwiched between the headrest stay guide and the headrest frame inside the headrest.

3. The headrest according to claim 2, wherein:
the headrest frame is configured by two members;
a mating surface of the headrest frame being configured by the two members and an insertion opening for the headrest stay guide are configured to intersect with each other; and
a surface on which the insertion opening is formed is a seal surface and an entire part of the seal surface is integrally formed.

4. The headrest according to claim 3, wherein:
a periphery of an insertion opening for the headrest stay guide of the headrest frame is annularly formed so that an entire periphery of the insertion opening is integrally formed.

5. The headrest according to claim 3, wherein:
the headrest frame has an inverted U-shape with a downwardly-facing free end on which an opening is formed; and
a stepped portion is formed on the opening.

6. The headrest according to claim 2, wherein:
a periphery of an insertion opening for the headrest stay guide of the headrest frame is annularly formed so that an entire periphery of the insertion opening is integrally formed.

7. The headrest according to claim 2, wherein:
the headrest frame has an inverted U-shape with a downwardly-facing free end on which an opening is formed; and
a stepped portion is formed on the opening.

8. The headrest according to claim 1, wherein:
a periphery of an insertion opening for the headrest stay guide of the headrest frame is annularly formed so that an entire periphery of the insertion opening is integrally formed.

9. The headrest according to claim 8, wherein:
the headrest frame has an inverted U-shape with a downwardly-facing free end on which an opening is formed; and
a stepped portion is formed on the opening.

10. The headrest according to claim 8, wherein:
the insertion opening for the headrest stay guide that is annularly formed is provided on the other of the front side and the rear side of the headrest frame made from the resin.

11. The headrest according to claim 1, wherein:
the headrest frame has an inverted U-shape with a downwardly-facing free end on which an opening is formed; and
a stepped portion is formed on the opening.

* * * * *